(12) United States Patent
Becker et al.

(10) Patent No.: US 6,848,075 B1
(45) Date of Patent: *Jan. 25, 2005

(54) INTERNET WEB BROWSER WITH MEMORY ENHANCED HYPERLINK DISPLAY

(75) Inventors: Craig Henry Becker, Austin, TX (US); David Wayne Glass, Georgetown, KY (US); Michael David Hocker, Staatsburg, NY (US); James Gordon McLean, Fuquay-Varina, NC (US); Clifford Alan Pickover, Yorktown Heights, NY (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/507,484

(22) Filed: Feb. 10, 2000

(51) Int. Cl.[7] .............................................. G06F 15/16
(52) U.S. Cl. ..................... 715/501.1; 709/214; 709/203
(58) Field of Search ................................ 709/225, 203, 709/214; 715/501.1, 500, 530; 707/9, 10

(56) References Cited

U.S. PATENT DOCUMENTS

| | | | |
|---|---|---|---|
| 5,603,034 A | 2/1997 | Swanson | 395/701 |
| 5,754,176 A | 5/1998 | Crawford | 345/338 |
| 5,761,683 A | 6/1998 | Logan et al. | 707/513 |
| 5,825,356 A | 10/1998 | Habib et al. | 345/338 |
| 6,163,778 A * | 12/2000 | Fogg et al. | 707/10 |
| 6,362,840 B1 * | 3/2002 | Burg et al. | 345/835 |
| 6,377,983 B1 * | 4/2002 | Cohen et al. | 709/217 |
| 6,411,996 B1 * | 6/2002 | Albers | 709/223 |
| 6,557,015 B1 * | 4/2003 | Bates et al. | 715/501.1 |
| 6,691,157 B2 * | 2/2004 | Muir et al. | 709/217 |
| 6,763,496 B1 * | 7/2004 | Hennings et al. | 715/501.1 |

FOREIGN PATENT DOCUMENTS

| | | |
|---|---|---|
| JP | 8-314790 | 11/1996 |
| JP | 8-314949 | 11/1996 |
| JP | 9-153912 | 6/1997 |

(List continued on next page.)

OTHER PUBLICATIONS

Netscape Communicator 4.08, Copyright 1994–1998, Help Manual, pp. 1–68.*

Comparing WFC and JVC: Foundation Classes for Java Development, *Dr. Dobb's Journal*, vol. 24, Issue 2, Feb. 1999, pp. 90–95.

"Next Button for Jumping/Tabbing between Internet Hypertext Transfer Protocol Hyperlinks", *IBM Technical Disclosure Bulletin*, 1/98, pp. 435–436.

RD–410107, May 20, 1998.

*Primary Examiner*—Stephen S. Hong
*Assistant Examiner*—Matthew Ludwig

(57) ABSTRACT

A web browser displays historical information about hyperlinks shown on web pages. Initially, a computer receives user instructions to download an internet web page, and begins the download. The computer identifies any hyperlinks present in the web page, and for each hyperlink, analyzes the hyperlink with respect to any of the user's past visits to the hyperlinked address. Analysis is performed with the following steps. First, the computer determines whether the user has previously selected that hyperlink, such by "mouse clicking" on the hyperlink. If so, the computer consults a database to identify characteristics of the underlying data obtained from past visits (or attempts) to the hyperlinked address. These characteristics are input into a presentation table to derive various enhanced presentation attributes for the hyperlink. The presentation table maps between each possible data characteristic and a corresponding enhanced presentation attribute. Presentation attributes may relate to text, graphics images, videos, sound, tactile sensations, etc. Ultimately, the computer displays the downloaded web page, each hyperlink with its enhanced presentation attributes.

25 Claims, 5 Drawing Sheets

FOREIGN PATENT DOCUMENTS

| | | | |
|---|---|---|---|
| JP | 11039310 | 7/1997 | ........... G06F/17/30 |
| JP | 9-259028 | 10/1997 | |
| JP | 10-116220 | 5/1998 | |
| JP | 10-171705 | 6/1998 | |
| JP | 10-222523 | 8/1998 | |
| JP | 10-301748 | 11/1998 | |
| JP | 10-307746 | 11/1998 | |
| JP | 11-110399 | 4/1999 | |
| JP | 11-259355 | 9/1999 | |
| JP | 11-328212 | 11/1999 | |
| JP | 11-338878 | 12/1999 | |

* cited by examiner

INTERNET WEB BROWSER WITH MEMORY ENHANCED HYPERLINK DISPLAY

BACKGROUND OF THE INVENTION

1. Field of the Invention

The present invention relates to internet web browsers. More particularly, the invention concerns an internet web browser that displays hyperlinks enhanced by the addition of colors, font changes, graphics, and other presentation attributes that represent characteristics from past visits to the hyperlinked web sites.

2. Description of the Related Art

Web browsers provide one of the most popular ways to access the internet. Broadly, a web browser is a computer program that provides a user friendly, graphical interface to display the contents of internet worldwide web pages ("web pages"). Web browser software directs the user's computer to play sounds, run programs, download software, and display text, graphics, and video. Although invisible to the computer user, web browsers actually operate by retrieving and then executing a web site's underlying program content, which takes the form of hypertext markup language ("HTML") or a similar language.

When displayed by a web browser, most web pages contain one or more "hyperlinks." From the user's perspective, a hyperlink is an on-screen input mechanism, serving an analogous function as a switch, dial, or other physical input apparatus. Hyperlinks are often implemented as graphics icons or text strings. The user activates the hyperlink by operating his/her mouse to place the cursor over the hyperlink and then "clicking" a mouse button; in response, the web browser causes some action to be performed. Frequently, this action involves changing the web browser's display to show a different web page, namely, that web page represented by the hyperlink. Other hyperlink actions include downloading software, displaying video, etc.

Some web browsers can be configured to automatically display hyperlinked web pages as underlined text. As an example, a web browser may display a hyperlink consisting of "IBM Patent Server". When the user mouse-clicks on this hyperlink, the web browser loads a web page represented by the hyperlink, in this example "http://www.patents.ibm.com/ibm.html." Instead of automatically displaying hyperlinked web pages as underlined text, some web browsers can be configured to temporarily add underlining when the cursor nears the hyperlink text. This feature is present, for example, in the Microsoft Windows Internet Explorer Version 4.72.3612.1713, dated 1995–1997.

Although certain brands of web browser software enjoy widespread commercial success today, engineers at International Business Machines Corp. ("IBM") are continually seeking to improve the performance and efficiency of the human-machine interface, including features such as web browsers. One feature under consideration, for example, is the use of one color (such as purple) to display hyperlinked web sites that the user has visited, and another color (such as blue) to display hyperlinked web sites that the user has not visited. As recognized by the present inventors, this arrangement may not be suitable for color blind people. In this and other respects, the present inventors have discovered that known web browser software is not completely adequate for some applications due to certain unsolved problems.

SUMMARY OF THE INVENTION

Broadly, the present invention provides a web browser program that enables a computer to present historical information about hyperlinks shown on web pages. This is achieved by enhancing hyperlinks with the addition of colors, font changes, graphics, and other presentation attributes that represent characteristics from past visits to the hyperlinked web site.

Initially, the computer receives a user's instructions to download an internet web page. As the computer begins to download the web page, it identifies any hyperlinks present in the web page. For each hyperlink, the computer analyzes the hyperlink with respect to any of the user's past visits to the hyperlinked address. Analysis is performed with the following steps. First, the computer determines whether the user has previously selected the current hyperlink in order to download its underlying data, such by "mouse clicking" on the hyperlink. If so, the computer consults a database to identify characteristics of the underlying data obtained from the user's past visits (or attempts) to the hyperlinked address. These characteristics are then referenced against a presentation table to determine how to present the hyperlink to the user. Namely, the presentation table maps between each possible data characteristic and a corresponding enhanced presentation attribute. Some exemplary presentation attributes and their corresponding data characteristics include (1) text font such as italics to represent sites that download rapidly, (2) text color such as black to represent expired hyperlinks, (3) specialty characters such as an asterisk to represent sites that have been highly rated by the user, or (4) multimedia symbols selected by the user to represent the hyperlinked data. Ultimately, when the computer displays the downloaded web page, it presents each hyperlink with its enhanced presentation attributes.

In still another embodiment, historical databases may be shared by an access group of two or more users. Databases may be shared, for example, among networked computers, colleagues, computers with users having common interests, computers whose users work for the same employer, customers of the same internet service provider, etc. Each user in the access group benefits from historical information about all group members' encounters with past hyperlinked data. Users may even select between a personal database and one or more databases shared by an access group.

The foregoing features may be implemented in a number of different forms. For example, the invention may provide a method to operate a computer to display historical information about past accesses to data represented by hyperlinks shown on web pages. In another embodiment, the invention may be implemented to provide an apparatus, such as a computer system, configured to display historical information about past accesses to data represented by hyperlinks shown on web pages. In still another embodiment, the invention may be implemented to provide a signal-bearing medium tangibly embodying a program of machine-readable instructions executable by a digital data processing apparatus to display historical information about past accesses to data represented by web page hyperlinks. Another embodiment concerns logic circuitry having multiple interconnected electrically conductive elements configured to operate as mentioned above.

The invention affords its users with a number of distinct advantages. Beneficially, whenever a user "clicks" on a hyperlink to download a web site, the invention downloads that web page, and conveniently enhances the presentation of each hyperlink to include features that represent characteristics from the user's past visit(s) to that hyperlink. In contrast to previous web browsers, which use mere color to distinguish between visited and non-visited web sites, the present invention's report is useful to color blind people since it can use font, sound, specialty characters, graphics images, and the like. Moreover, this additional information provides information that helps the user avoid time consuming and possibly unproductive selection of:

1. Hyperlinks that have previously led to web sites that were under construction.
2. Hyperlinks that have previously led to expired web pages or services.
3. Hyperlinks that have previously resulted in large amounts of software, images, or other data to download.
4. Hyperlinks that have had other undesirable characteristics, as encountered by the user during previous selection of those hyperlinks.

With the benefit of this information in advance, the user can avoid the time consuming pitfalls of selecting certain hyperlinks. Thus, the present invention ultimately helps computer users improve their time efficiency while utilizing the internet. By aiding users in avoiding undesirable links, the invention also serves to reduce overall internet traffic. In addition, by reporting whether the user has already bookmarked a hyperlink, the invention helps users avoid flooding their bookmarks with redundant entries. As still another benefit, the shared database feature of this invention assists individual users by providing historical access information encountered by members of an access group, even for hyperlinks that the individual user has never accessed. Another benefit is that the invention helps users return to valuable web pages that have proven to be relevant to their needs. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Overall Structure—Single User Embodiment

Figure 1A:
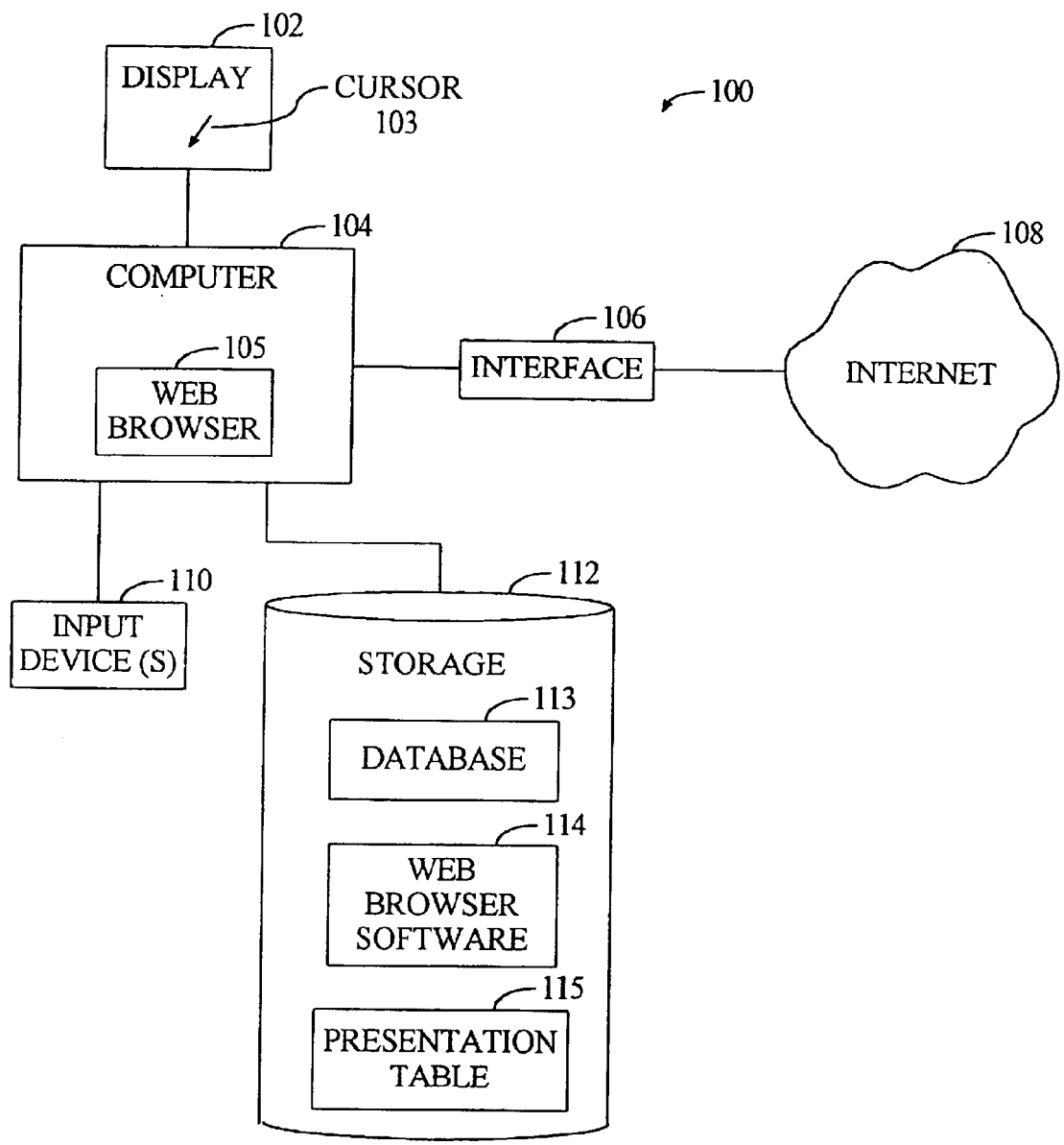
FIG. 1A is a block diagram of the hardware components and interconnections of a single-user internet access system according to the invention.

One aspect of the invention concerns an information system, which may be embodied by various hardware components and interconnections, with one example being described by the system 100 of FIG. 1A. The system 100 includes a computer 104 coupled to a display 102, interface 106, storage 112, and input device 110. The interface 106 is coupled to the internet 108.

Considering the components of FIG. 1A in more detail, the computer 104 comprises an apparatus such as a personal computer, computer workstation, "web TV," or other internet access device capable of accessing and navigating the internet 108. The computer 104 includes a web browser program 105 ("web browser"). The display 102 comprises a liquid crystal display (LCD), cathode ray tube (CRT), flat panel, or other display capable of presenting text and graphics. In implementations where the computer 104 is implemented with "web TV," the display 102 may be incorporated with the computer 104. At certain times, depending upon output of the computer 104, the display 102 may present a cursor 103.

The interface 106 comprises a telephone modem, cable modem, Ethernet card, or other apparatus to facilitate bidirectional communications between the computer 104 and the internet 108. Although the illustrated internet 108 is most useful in the context of massive data repositories such as the public internet, the internet 108 may also be embodied by a private internet ("intranet"), networked storage, local storage (such as local hard disk drive), or other any other storage facility whose structure may be interpreted and presented by a web browser.

The storage 112 represents rewritable, nonvolatile digital data storage, such as a magnetic hard disk drive, magnetic tape, random access memory ("RAM") with battery backup, etc. The storage contains a database 113 and presentation table 115, the structure and operation of which is described in greater detail below. The database 113 may be referred to as a "personal" database, as it contains information about past internet activities of the user) of the computer 104. An additional database (not shown) may be added for each additional user of computer 104, or multiple people can utilize a single user profile. The storage 112 also contains various machine-executable computer programs, the content of which depends upon the computer's hardware structure, intended use, and configuration. Among other such programs, the storage 112 contains internet web browser software 114, utilized by the web browser program 105. Examples of this software include the IBM Web-Explorer product, Netscape Navigator, Microsoft Internet Explorer, etc.

The system 100 also includes one or more user input devices 110, such as a computer mouse, keyboard, trackball, foot pedal, voice sensor, eye position sensor, or other user input mechanism. Among other possible functions, the input device 110 receives input to control position of cursor presented on the display 102, and select items to which the cursor points. The input devices 110 may also serve to provide "tactile" output perceivable to the human touch. Some examples include vibration, heat, cold, etc.

Exemplary Digital Data Processing Apparatus

Another aspect of the invention concerns a digital data processing apparatus, which may be used to implement the computer 104. This apparatus may be embodied by various hardware components and interconnections; one example is the digital data processing apparatus 200 of FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise RAM, and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, a different embodiment of the invention uses logic circuitry instead of computer-executed instructions to implement the computer 104. Depending upon the particular requirements of the application in the areas of speed, expense, tooling costs, and the like, this logic may be implemented by constructing an application specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

More Detail: Storage Contents

As mentioned above, the storage 112 contains a database 113. The database 113 contains information about the hyperlinks that the computer user has selected in the past. Each time the computer user selects a hyperlink, such as by "mouse clicking," this causes the computer 104 to download underlying data from a web address represented by the hyperlink. Although the underlying data may comprise a hyperlinked web page in most cases, other forms of underlying data are possible as well, such as software programs, sound files, graphics images, etc.

As shown by the specific example of TABLE 1 (below), the database 113 includes various features of the data underlying each hyperlinked web address, according to past visits:

1. The hyperlinked web address itself, which may be listed in as a "www" or other address according to a suitable protocol, such as TCP/IP, for example.
2. The size of the "underlying data" that was downloaded when the hyperlinked web address was accessed by the web browser.
3. The time of downloading the underlying data. This may include, for example, the time required to download the data the last time the user accessed it, or the average time required to download the data if the user has accessed this hyperlink more than once in the past.
4. The number of times that the user has previously visited or "hit" the hyperlinked web address.
5. The number, type, severity, and/or other characteristics of errors experienced during previous visits to the hyperlinked web address.
6. The date and/or time of the user's most recent visit to the hyperlinked web address.
7. Whether the user has directed the web browser 105 to create a bookmark for the hyperlinked web address.
8. One or more multimedia symbols selected by the computer user to represent the hyperlinked web address in the manner explained below. Examples include sounds, graphics images, animations, videos, tactile outputs, etc.
9. A single or average rating entered by the computer user during one or more previous visits to the hyperlinked web address.
10. The length of time of previous visits to the hyperlinked address, according to past average or most recent visit.

TABLE 1

EXEMPLARY DATABASE

| | | | | |
|---|---|---|---|---|
| HYPERLINKED WEB ADDRESS | http://www.ibm.com | http://www.ibm.com/products | http://www.patent-invention.com | ... |
| DOWNLOAD SIZE | 20 Kb | 25 Kb | 1 Mb | ... |
| DOWNLOAD TIME | 9 seconds | 1.5 seconds | 6 seconds | ... |
| # HITS | 17 | 142 | 1 | ... |
| ERRORS? | none | none | 1, under construction | ... |
| DATE/TIME OF LAST DOWNLOAD | 11/29/1999 | 12/11/1999 | 12/24/1999 | ... |
| BOOKMARKED? | yes | no | no | ... |
| SYMBOL | c:\sounds\ibm.wav c:\images\ibm-logo.jpg | none | none | ... |
| USER RATING | 9 | 9 | none | ... |
| AVERAGE TIME OF PREVIOUS VISITS | 20 minutes | 18 minutes | 0 | ... |

Although TABLE 1 illustrates one specific type of the database 113, ordinarily skilled artisans (having the benefit of this disclosure) will recognize that this invention also contemplates many variations in the number and type of characteristics listed in the database 113. Furthermore, the types of characteristics represented in the database 113 may be specified by the user, in case the user's interests vary from the information provided by the specific example of TABLE 1.

TABLE 2 (below) shows a specific example of the presentation table 115. The presentation table 115 maps between various types of characteristics of hyperlinked data and corresponding enhanced presentation attributes. The table 115 is used in determining how to present each hyperlink. In short, TABLE 2 instructs the computer 104 how to present a hyperlink, according to which characteristics that hyperlink possesses (from TABLE 1).

The presentation may also include one or more mappings with complex or combined criteria (not shown). For example, a hyperlink may be shown in red with a large, flashing font if a user has accessed the hyperlink more than three times in the past, and the user rating exceeds eight.

TABLE 2

EXEMPLARY PRESENTATION TABLE

| CHARACTERISTIC | PRESENTATION ATTRIBUTE |
|---|---|
| DOWNLOAD SIZE | >1 Mb: SHOW IN BROWN |
|  | <1 Mb: SHOW IN GREEN |
| DOWNLOAD TIME | >5 SECONDS: |
|  | SHOW ### NEXT TO HYPERLINK |
|  | >1 SECOND: |
|  | SHOW ## NEXT TO HYPERLINK |
|  | <1 SECOND: |
|  | SHOW # NEXT TO HYPERLINK |
| UNDER CONSTRUCTION | SHOW CONSTRUCTION SIGN |
| EXPIRED LINK | SHOW IN RED |
| # PREVIOUS HITS (VISITS) TO HYPERLINKED ADDRESS | PLACE NUMBER OF HITS FOLLOWING LETTER H |
| ERRORS? | IF ANY ERRORS, SHOW "E!" |
| DATE/TIME OF LAST DOWNLOAD | IF WITHIN PREVIOUS 7 DAYS, SHOW HYPERLINK IN 12 POINT FONT; IF LONGER THAN 7 DAYS, SHOW HYPERLINK IN 10 POINT FONT |
| BOOKMARKED? | SHOW "B" IN PARENTHESIS |
| SYMBOL | PRESENT USER-DESIGNATED SYMBOL (E.G., SHOW THUMBNAIL IMAGE NEXT TO HYPERLINK) |
| USER RATING | SHOW USER RATING FOLLOWING LETTER "U" |

According to the present invention, values in the presentation table may be changed by the user, system administrator, system super-user, or other appropriate entity. For example, the user may wish to tune the thresholds and conditions of the presentation attributes. In one embodiment, this may be done by direct re-definition, inputting specific thresholds and other conditions such as "show web pages in green if download size >1 Mb." One alternative is to enter more general conditions such as "show web pages in green if download size is large," where the details of these general conditions are implemented by the computer 104.

Overall Structure—Multi-User Embodiment

Figure 1B:
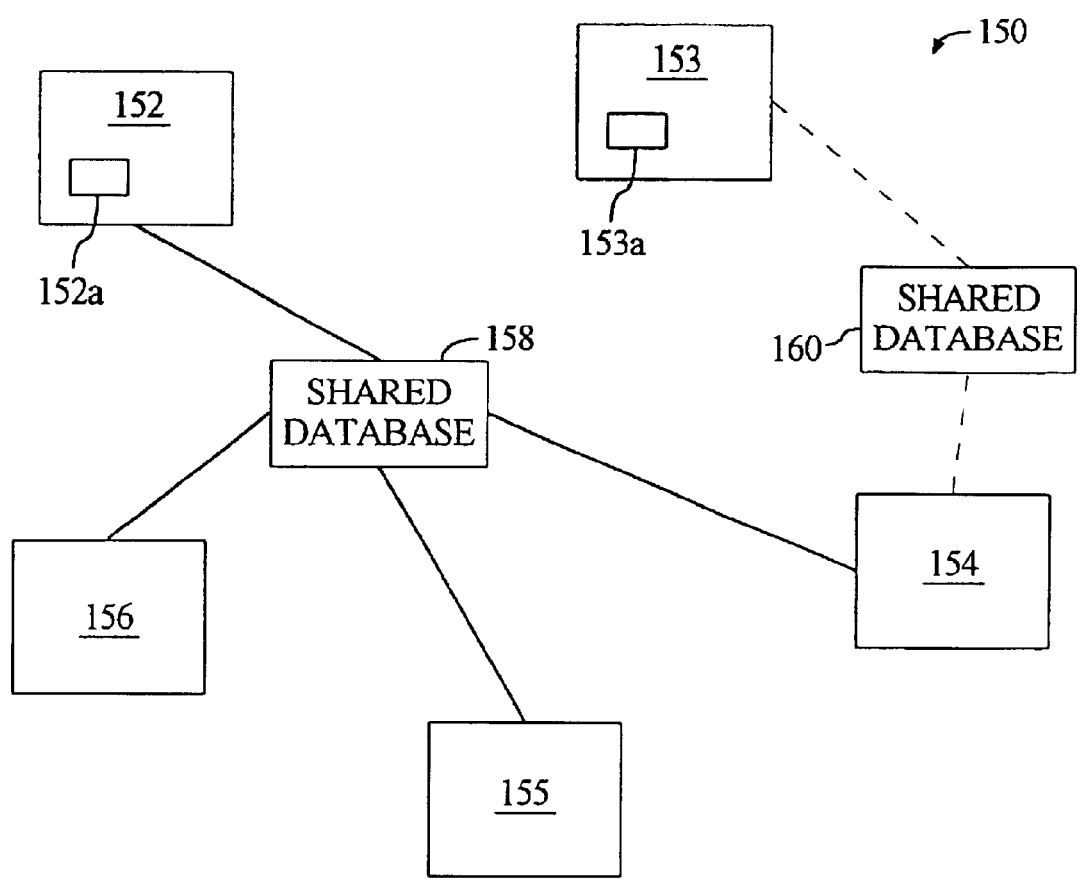
FIG. 1B is a block diagram of the hardware components and interconnections of a multi-user internet access system according to the invention.

In addition to the single-user embodiment described above, the present invention contemplates a multi-user arrangement, which may be embodied by various hardware components and interconnections, with one example being described by the information system 150 of FIG. 1B. The system 150 includes multiple computers 152–156, each of which may contain similar components (not shown) as shown in the single-user application of FIG. 1A. The computers 152–156 illustrate a variety of different database access styles. Namely, the computers 152–153 include separate, respective personal databases 152a, 153a. In contrast, the computers 152, 154–156 share access to the shared database 158. The database 158 may be shared among the computers 152, 154–156 by means of a local or wide area network, the public internet, private internet, bulletin board accessible by dial-up modem, token ring, shared hard disk, or any other arrangement providing data that is accessible to all computers 152, 154–156. Separately, the computers 153–154 share a database 160. The means of sharing the database 160 may be similar to sharing of the database 158.

The computers that share access to a database are referred to as an access group. If an access group has a smaller membership than the physical connections provide, passwords or other suitable means may be employed to limit database access to group members only. Accordingly, database sharing may be defined by factors additional to physical connection or accessibility to the shared database. For example, each computer may be utilized by several users, and each user may or may not have access to a shared database that is otherwise physically accessible to that computer. Accessibility may be determined by user profiles, access rights given by system administrators, passwords, etc. A shared database may be available to employees of a particular company, users of a particular internet service provider, users in a particular geographic location, users of a particular class (e.g., income, spending habits, interests), etc. Thus, an access group may be comprised of computer users and/or machines. In the case of a single user (FIG. 1A), the access group consists of that single member.

As explained in greater detail below, each personal database provides historical hyperlink access information for one or more users of a particular computer. Each shared database provides historical hyperlink access information for all users of the access group that shares that database. Thus, an individual user benefits from the shared database by receiving historical information about hyperlinks that this user has never visited.

OPERATION

In addition to the various hardware embodiments described above, a different aspect of the invention concerns a method for operating an internet web browser to display hyperlinks that are enhanced by the addition of colors, font changes, graphics, and other display characteristics that reveal characteristics from past visits to the underlying data. The web browser of this invention may additionally be configured to solicit and record certain information from the user, such as web site ratings, comments, etc.

Signal-Bearing Media

In the context of FIG. 1A, such a method may be implemented, for example, by operating the computer 104, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to operate an internet web browser to display web page hyperlinks that are enhanced by the addition of colors, font changes, graphics, and other presentation attributes that represent characteristics from past visits to the hyperlinked web site.

Figure 2:
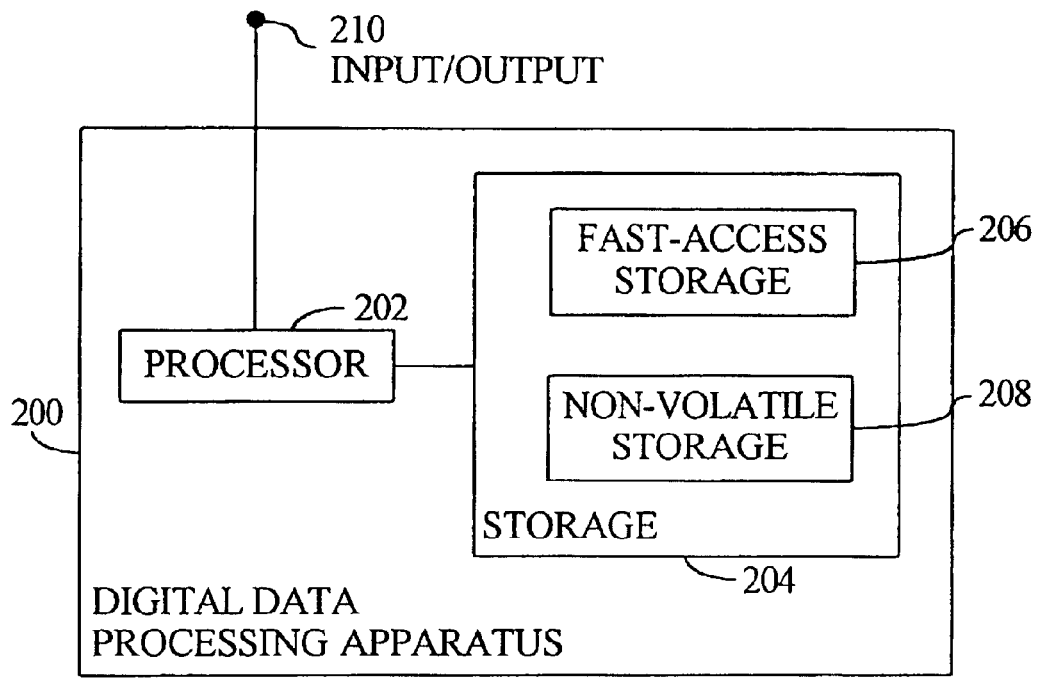
FIG. 2 is a block diagram of a digital data processing machine according to the invention.
Figure 3:
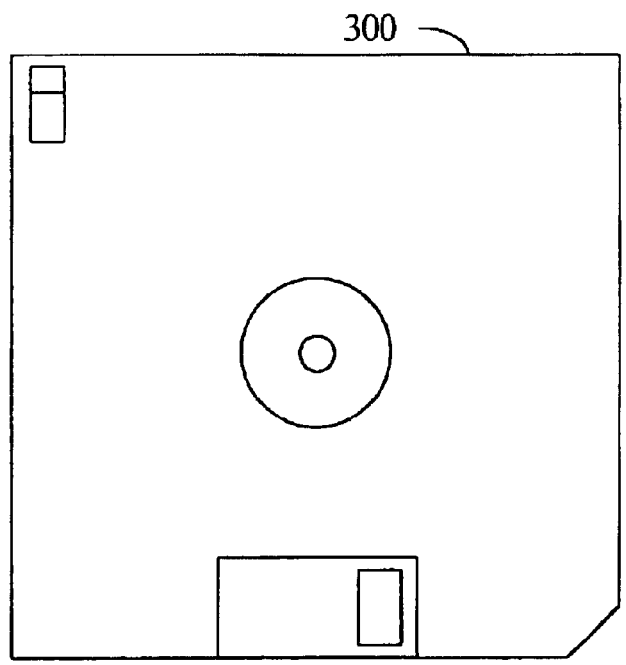
FIG. 3 shows an exemplary signal-bearing medium according to the invention.

This signal-bearing media may comprise, for example, RAM (not shown) contained within the computer 104 (FIG. 1A), as represented by the fast-access storage 206 (FIG. 2). Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional "hard drive," redundant array of inexpensive disks ("RAID"), or another direct access storage device ("DASD")), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the computer 104, and is configured to perform operations to implement the method of the invention. The logic circuitry may be implemented using many different types of circuitry, as discussed above.

Overall Sequence of Operation

Figure 4:
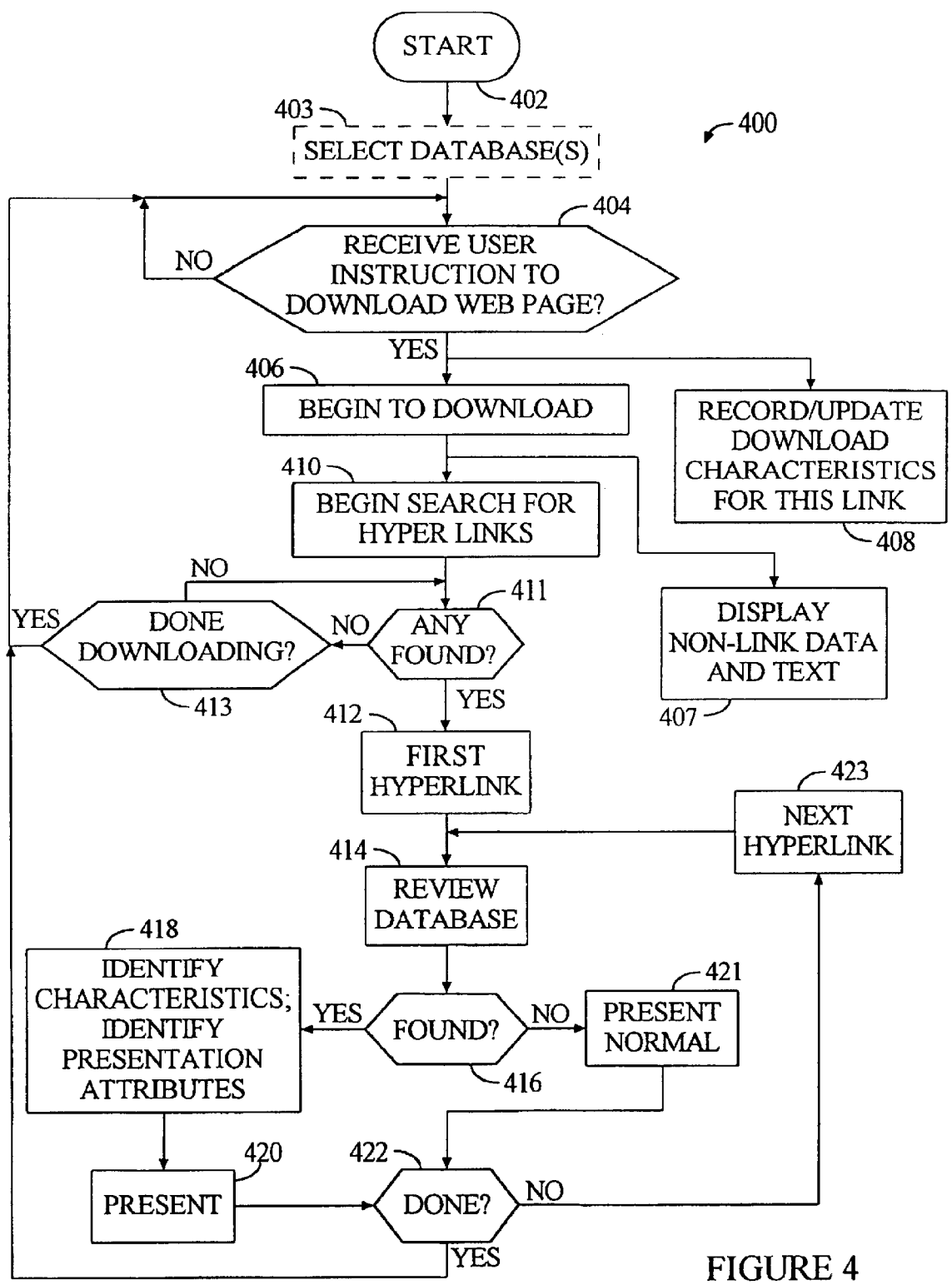
FIG. 4 is a flowchart of one method to present hyperlinks enhanced by certain presentation attributes representing characteristics of the underlying data gleaned from past visits to the hyperlinked web sites, according to the invention.

FIG. 4 shows a sequence 400 to illustrate one example of the method aspect of the present invention. For ease of explanation, but without any intended limitation, the example of FIG. 4 is described in the context of the single user system 100 described above (FIG. 1A). The sequence 400 is performed by the computer 104. More particularly, the sequence 400 may be performed by the web browser 105 or other similar program running on the computer 104. According to this sequence 400, the computer presents hyperlinks that are enhanced by the addition of colors, font changes, graphics, and other presentation attributes that represent characteristics from past visits to the hyperlinked data.

The sequence 400 is initiated in step 402. Next, step 403 is performed in the optional hardware embodiment where the computer 104 has access to multiple databases, such as one personal database (present in local storage 112) and one shared database (present in common storage 158). In still another embodiment, the computer 104 itself may store multiple databases in local storage 112 for different users that operate the compute 104.

If multiple databases are available, the user in step 403 chooses one of the personal or shared databases to use. For purposes of illustration, the user selects the database 113 in this example. The user's selection may, for example, occur in response to prompting by the computer 104 at an appropriate time, such as loading of the web browser 105. Instead of user selection, the database may be chosen automatically by the computer 104 in accordance with the users identity, determined by the user's entry of a password, log-on sequence, user name, or other technique.

Next, in step 404, the computer determines whether it has received an instruction to download a web page. This may occur when a user instructs the computer 104 to download a web page, for example by entering a web address into the web browser 105 or selecting a hyperlink. This web page is called the "current" web page. With an affirmative answer to step 404, the computer 104 begins to download the current web page in step 406. Concurrently with step 406, the computer 104 records certain predetermined characteristics of the underlying data in the database 113 (step 408). Namely, step 408 observes, measures, or otherwise determines the characteristics of the various types listed in the database 113 for the underlying data or the process of its downloading. The measurement of step 414 occurs during and/or after the download, as appropriate to the particular characteristic being measured.

Step 408 may also actively solicit, passively receive, or otherwise obtain further user-supplied characteristics, such as the user's rating of the web site, software, image, or other underlying data. Another example is a multimedia symbol such as a thumbnail image, sound, or other specialized tool that the user selects to represent the underlying data whenever the hyperlink is subsequently displayed as described in step 408, below. User selection may be achieved by entering a storage address of the symbol, activating a pull-down menu of symbols, etc. Furthermore, instead of user selection, one or more multimedia symbols may be selected by a system administrator, system super-user, or automated software. For example, automated software may automatically select a construction sign as a multimedia symbol if the hyperlinked site is under construction.

After the download begins in step 406, the computer 104 displays the current web site's non-hyperlink data and text (step 407). The computer 104 suspends display of the web site's hyperlinks so that the hyperlinks can be presented with certain presentation attributes representing various characteristics of the underlying data that have been determined by the user's past accesses to the hyperlinked data. Alternatively, the hyperlinks may be immediately displayed in step 407 without any enhancement, where the hyperlinks are subsequently updated (individually or in group fashion) after they have been analyzed.

Step 406 also leads to step 410, where the computer 104 begins to search the current web page for any hyperlinks contained therein. As an example, this search may involve reviewing web page data as it is downloaded. A different and less time efficient approach is to wait until the entire web page is downloaded before beginning the search of step 410. Hyperlinks in the web page may be identified, for example, by reviewing the underlying code, such as HTML or similar code, for syntax that is particular to hyperlinks.

Step 411 asks whether any hyperlinks were found in the data download. If not, step 413 asks whether the download has finished. If so, there are not any hyperlinks in the entire web page, and step 413 returns to step 404 to await the user's instruction to load another web page. On the other hand, the download is not yet complete, step 413 returns to step 411.

If step 411 finds any hyperlinks in the current web page, the computer 104 begins to analyze each hyperlink by performing certain additional steps. In step 412, the computer 104 selects a first hyperlink to examine, whereupon this hyperlink becomes the "current" hyperlink under consideration. As an example, step 412 may select this hyperlink because it is the first hyperlink to be downloaded, first to be found, or possesses another attribute. Next, the computer 104 determines whether the user has previously directed the computer 104 to "select" the current hyperlink for the purpose of downloading the underlying data represented by that hyperlink. This is achieved by reviewing the database 113 (step 414), and then determining whether the current hyperlink appears there (step 416).

In an alternative embodiment, step 414 may only cross-reference certain entries if the user only cares about some hyperlink characteristics, indicating this choice to the computer by user profile or other selection. For example, the user might only care about download times and download sizes.

In the single user, non-shared database embodiment, step 414 references the personal database 113 to identify characteristics of the current hyperlink's underlying data from the single user's previous visits to the current hyperlink. In the multi-user, shared database environment, step 414 references the appropriate shared database to identify collective characteristics of the current hyperlink's underlying data from all previous visits to the current hyperlink by access group members.

If the current hyperlink is not found in the database 113, step 421 presents the hyperlink without any enhanced presentation attributes, then advances to step 422 (discussed below). A different sequence is performed if the current hyperlink is found in the database 113. Namely, step 418 determines how the hyperlink should be presented. This involves (1) referencing the database 113 to identify characteristics of the underlying data obtained from the user's previous selections of the hyperlink, and also (2) referencing the identified characteristics against the presentation table 115 to derive a resultant set of enhanced presentation attributes for the hyperlink. As explained above, the presentation table 115 maps between data characteristics and corresponding enhanced presentation attributes. These presentation attributes determine how the computer 104 will present the hyperlink.

The hyperlink is presented in step 420. The presentation of the hyperlink includes, for example, its appearance on the display 102. Other multimedia features may also be used to present a hyperlink, such as sound, tactile output (such as varying mouse vibration or temperature in different patterns or frequencies, etc.), and the like. In one embodiment, the presentation of step 420 may involve additions or changes to the usual hyperlink appearance in its surrounding web page, as illustrated in the example of FIG. 5B, discussed below.

After step 420, step 422 determines whether all hyperlinks of the current web page have been processed. If so, the routine 400 returns to step 404 to await another instruction from the user to download a different web page. On the other hand, if step 422 determines that the current web page contains more hyperlinks to process, step 423 selects a next hyperlink, making this link the "current" hyperlink, and returns to step 414.

Alternative

As one alternative to the foregoing sequence, steps 412–423 may be delayed. Namely, the computer 104 may delay comparison of any hyperlinks to the database 113 and presentation table 115 until certain input actions occur, such as the cursor 103 having a prescribed proximity to a hyperlink appearing on the display 102. When this occurs, the computer 104 performs steps 414–423 specifically for this hyperlink. Depending upon the application, the computer 104 may be programmed to present the hyperlink with persistent enhanced presentation attributes in step 420. Alternatively, the computer 104 may remove the enhanced presentation attributes whenever the prescribed input action (such as mouse proximity) no longer occurs.

EXAMPLE

Figure 5A:
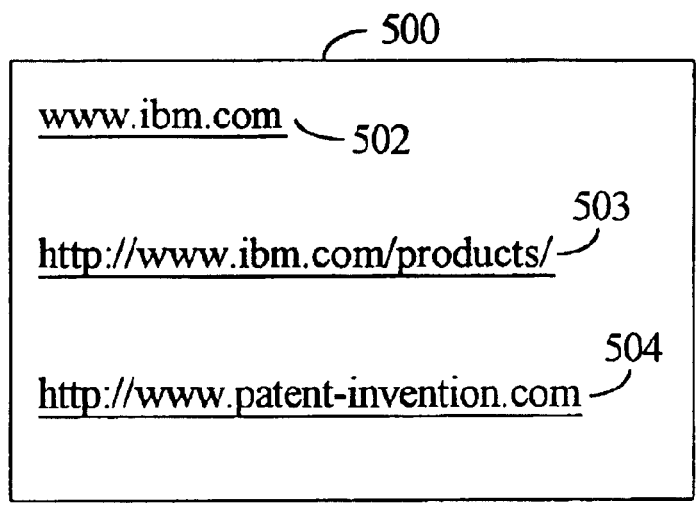
FIG. 5A is a diagram illustrating a sample web page with hyperlinks shown free from enhanced presentation attributes.
Figure 5B:
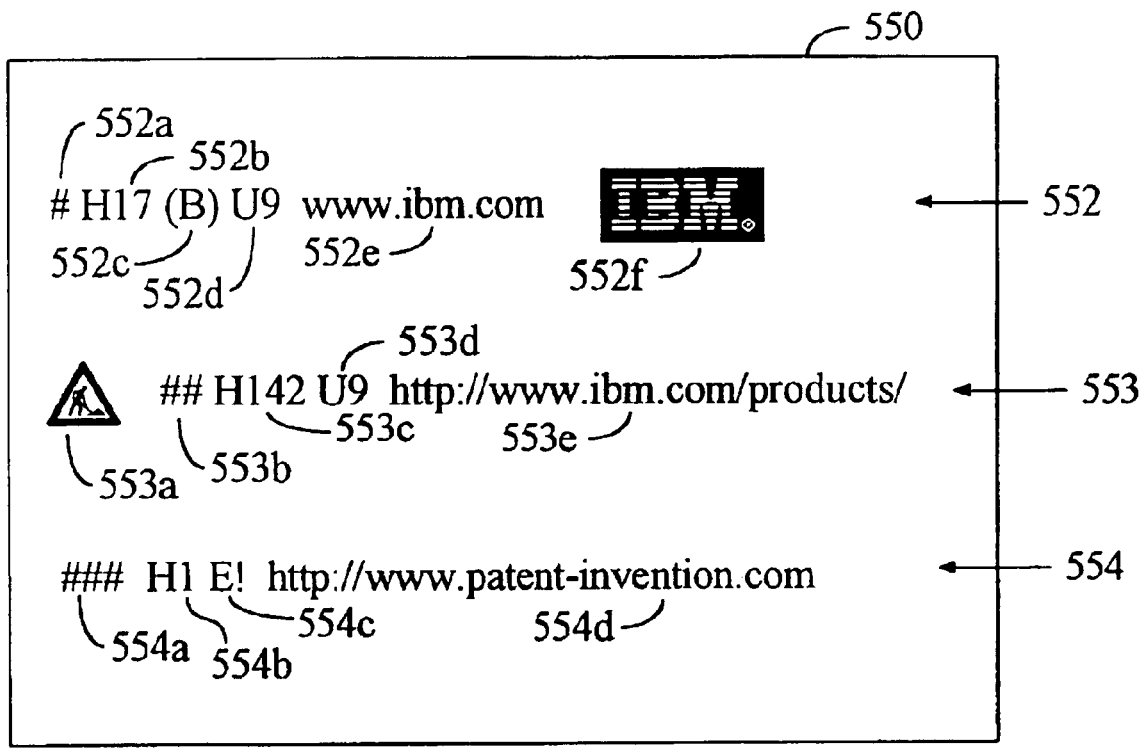
FIG. 5B is a diagram illustrating the sample page where hyperlinks include enhanced presentation attributes according to the invention.

FIG. 5A provides an exemplary computer screen display 500, presented upon the display 102 in step 420. The screen display 500 presents three hyperlinks 502, 503, 504. In this example, the computer 104 has not accessed any of the cited hyperlinks before. Therefore, the hyperlinks 502–504 are shown without any enhanced presentation attributes. As an optional feature that is popular with most internet web browsers, the hyperlinks 502–504 are shown, however, with underlining to show that they are hyperlinks.

FIG. 5B provides a different example of computer screen display 550, also presenting three hyperlinks 552, 553, 554. In this example, the computer 104 has previously accessed each of the cited hyperlinks 552–554, and their access history is shown in the database 113. Due to the access history, the hyperlinks 552–554 are shown with their enhanced presentation attributes, determined according to the presentation table 115.

Reference is made to FIG. 5B in conjunction with TABLE 1 (above) to discuss the presentation of the hyperlinks 552–554 in greater detail. The hyperlink 552 includes:

1. A "#" sign 552*a*, indicating that the hyperlink's most recent download time is less than one second.
2. The "H17" code 552*b*, indicating that the web browser 105 has visited the hyperlink seventeen times.
3. The "(B)" code 552*c*, indicating that the computer user has already directed the web browser 105 to bookmark this hyperlink.
4. The code U9 552*d*, indicating that the computer user has given this hyperlink's underlying data a user rating of "nine" out of ten.
5. The IBM logo 552*f*, selected by the user (step 408) as a multimedia symbol to graphically represent this hyperlink.
6. The internet address 552*e*.

Turning to the hyperlink 553, this hyperlink includes:

1. An "under construction" logo 553*a*, indicating that the hyperlink represents a web page that is under construction.
1. A "##" sign 553*b*, indicating that the hyperlink's most recent download time is between one and five seconds.
2. The "H142" code 553*c*, indicating that the web browser 105 has visited the hyperlink one hundred forty two times.
4. The code U9 553*d*, indicating that the computer operator has given this hyperlink's underlying data a user rating of "nine" out of ten.
5. An internet address 553*e*.

The hyperlink 554 includes:

1. A "###" sign 554*a*, indicating that the hyperlink's most recent download time is more than five seconds.
2. The "H1" code 554*b*, indicating that the web browser 105 has visited the hyperlink once.
3. The "E!" code 554*c*, indicating that the web browser 105 experienced errors during previous selection of this hyperlink.
4. An internet address 554*d*.

In addition, the screen 550 may present other enhanced presentation attributes, such as color, and/or sound, tactile output, which are not shown in FIG. 5B.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for operating a computer to display historical information about hyperlinks shown on web pages, the method comprising the following operations performed by the computer:

responsive to receiving user instructions to download a web page, commencing downloading of the web page;

identifying any hyperlinks present in the web page;

for each identified hyperlink, analyzing the hyperlink by performing steps comprising:

determining whether one or more users in a predefined access group have previously selected the identified hyperlink to download underlying data represented by the hyperlink;

only if one or more users in the predefined access group have previously selected the hyperlink, consulting a database to identify characteristics of the underlying data obtained from previous selections of the hyperlink by users in the access group;

referencing the identified characteristics against a presentation table to derive enhanced presentation attributes appropriate to the hyperlink;

displaying the downloaded web page, including presenting each hyperlink with its derived enhanced presentation attributes; and responsive to the user selecting a hyperlink to download underlying data represented by the hyperlink, the computer downloading the underlying data represented by the hyperlink, and recording predetermined characteristics of the underlying data in the database.

2. The method of claim 1, the predefined access group having a single member.

3. The method of claim 1, the predefined access group having multiple members, where the database is accessible to all members.

4. The method of clam 1, the operations further including:

prior to analyzing the hyperlink, selecting the database from multiple available databases.

5. The method of claim 1, the operations of presenting each hyperlink with its derived enhanced presentation attributes including at least one of the following:

displaying text, displaying graphics, generating sound, providing tactile output.

6. The method of claim 1, where the displaying operation comprises:

initially displaying the web page such that hyperlinks are free from enhanced presentation attributes;

the computer awaiting predetermined user input including direction of a cursor proximate any of the displayed hyperlinks; and responsive to the predetermined user input occurring for a hyperlink, presenting the hyperlink with its derived enhanced presentation attributes.

7. The method of claim 6, the predetermined user input additionally including depressing of one or more buttons on a computer mouse while the cursor is proximate the hyperlink.

8. The method of claim 6, further comprising:

sensing when the predetermined user input is absent, and then presenting the hyperlink free from its enhanced presentation on attributes.

9. The method of claim 1, where the characteristics of the underlying data obtained from previous selections include one or more of the following:

size of the underlying data;
dates of one or more previous selections of the hyperlink;
times of one or more previous selections of the hyperlink;
a length of time to download the underlying data;
one or more multimedia representative symbols, including one or more of the following:
graphics, sound, animation, video;
number of previous selections of the hyperlink;
user ratings of the underlying data;
whether the underlying data constitutes a web site that is under construction;
whether the hyperlink represents an expired link;
whether the user has bookmarked the underlying data;
any errors occurring during previous selections of the hyperlink.

10. The method of claim 1, the enhanced presentation attributes including one or more of the following: changes in text font, changes in text color, changes in text underlining, addition of specialty characters, addition of images.

11. A method for operating a computer to display historical information about hyperlinks shown on web pages, the method comprising the following operations performed by the computer;

responsive to receiving user instructions to download a web page commencing downloading of the web page;

identifying any hyperlinks present in the web page;

for each identified hyperlink, analyzing the hyperlink by performing steps comprising:

determining whether one or more users in a predefined access group have previously selected the identified hyperlink to download underlying data represented by the hyperlink;

only if one or more users in the predefined access group have previously selected the hyperlink, consulting a database to identify characteristics of the underlying data obtained from previous selections of the hyperlink by users in the access group;

referencing the identified characteristics against a presentation table to derive enhanced presentation attributes appropriate to the hyperlink;

displaying the download web page, including presenting each hyperlink with its derived enhanced presentation attributes;

responsive to the user selecting a hyperlink to download underlying data represented by the hyperlink:

the computer soliciting user specification of one or more of the following in association with the underlying data:

user rating of the underlying data;

one or more representative multimedia symbols of one or more of the following types: graphics images, sounds, videos, animations, tactile sensations; and the computer recording the user specification in the database in association with the hyperlink.

12. A method for operating a computer to display historical information about hyperlinks shown on web pages, the method comprising the following operation performed by the computer:

responsive to receiving user instructions to download a web page, commencing downloading of the web page;

identifying any hyperlinks present in the web page;

for each identified hyperlink, analyzing the hyperlink by performing steps comprising:

determining whether one or more users in a predefined access group have previously selected the identified hyperlink to download underlying data represented by the hyperlink;

only if one or more users in the predefined access group have previously selected the hyperlink, consulting a database to identify characteristics of the underlying data obtained from previous selections of the hyperlink by users in the access group;

referencing the identified characteristics against a presentation table to derive enhanced presentation attributes appropriate to the hyperlink;

displaying the downloaded web page, including presenting each hyperlink with its derived enhanced presentation attributes;

determining whether the computer has received predetermined user input including direction of a cursor proximate a hyperlink; and where performance of the analyzing operation for each hyperlink is conditioned upon receipt of the predetermined user input for that hyperlink.

13. A sign-bearing medium tangibly embodying a program of machine-readable instructions executable by a digital processing apparatus to perform a method for operating a computer to display historical information about hyperlinks shown on web pages, the method comprising the following operations performed by the computer:

responsive to receiving user instructions to download a web page, commencing downloading of the web page;

identifying any hyperlinks present in the web page;

for identified hyperlink, analyzing the hyperlink by performing steps comprising:

determining whether one or more users in a predefined access group have previously selected the identified hyperlink to download underlying data represented by the hyperlink;

only if one or more users in the predefined access group have previously selected the hyperlink, consulting a database to identify characteristics of the underlying data obtained from previous selections of the hyperlink by users in the access group;

referencing the identified characteristics against a presentation table to derive enhanced presentation attributes appropriate to the hyperlink;

displaying the downloaded web page, including presenting each hyperlink with its derived enhance presentation attributes; and responsive to the user selecting a hyperlink to download underlying data represented by the hyperlink, the computer downloading the underlying data represented by the hyperlink, and recording predetermined characteristics of the underlying data in the database.

14. The medium of claim 13, the predefined access group having a single member.

15. The medium of claim 13, the predefined access group having multiple members, where the database is accessible to all members.

16. The medium of claim 13, the operations further including:

prior to analyzing the hyperlink, selecting the database from multiple available databases.

17. The medium of claim 13, the operations of presenting each hyperlink with its derived presentation attributes including at least one of the following:

displaying text, displaying graphics, generating sound, providing tactile output.

18. The medium of claim 13, where the displaying operation comprises:

initially displaying the web page such that hyperlinks are free from enhanced presentation attributes;

the computer awaiting predetermined user input including direction of a cursor proximate any of the displayed hyperlinks; and responsive to the predetermined user input occurring for a hyperlink, presenting the hyperlink with its derived enhanced presentation attributes.

19. The medium of claim 18, the predetermined user input additionally including depressing of one or more buttons on a computer mouse while the cursor is proximate the hyperlink.

20. The medium of claim 18, further comprising:

sensing when the predetermined user input is absent, and then presenting the hyperlink free from its enhanced presentation attributes.

21. The medium of claim 13, where the characteristics of the underlying data obtained from previous selections include one or more of the following:

size of the underlying data;

dates of one or more previous selections of the hyperlink;

times of one or more previous selections of the hyperlink;

a length of time to download the underlying data;

one or more multimedia representative symbols, including one or more of the following:

graphics sound, animation video;

number of previous selections of the hyperlink;

user ratings of the underlying data;

whether the underlying data constitutes a web site that is under construction;

whether the hyperlink represents an expired link;

whether the user has bookmarked the underlying data;

any errors occurring during previous selections of the hyperlink.

22. The medium of claim 13, the enhanced presentation attributes including one or more of the following: changes in text font, changes in text color, changes in text underlining, addition of specialty charade images.

23. A signal-bearing medium tangibly embodying a program of machine-readable instructions executable by a digital processing apparatus to perform a method for operating a computer to display historical information about hyperlinks shown on web pages, the method comprising the following operations performed by the computer:

responsive to receiving user instructions to download a web page, commencing downloading of the web page;

identifying any hyperlinks present in the web page;

for each identified hyperlink analyzing the hyperlink by performing steps comprising:

determining whether one or more users in a redefined access group have previously selected the identified hyperlink to download underlying data represented by the hyperlink;

only if one or more users in the predefined access group have previously selected the hyperlink, consulting a database to identify characteristics of the underlying data obtained from previous selections of the hyperlink by users in the access group;

referencing the identified characteristics against a presentation table to derive enhanced presentation attributes appropriate to the hyperlink;

displaying the downloaded web pages, including presenting each hyperlink with its derived enhanced presentation attributes;

responsive to the user selecting a hyperlink to download underlying data represented by the hyperlink:

the computer soliciting user specification of one or more of the following in association with the underlying data:

user rating of the underlying data;

one or more representative multimedia symbols of one or more of the following types: graphics images, sounds, videos, animations, tactile sensations; and the computer recording the user specification in the database in association with the hyperlink.

24. A signal-bearing medium tangibly embodying a program of machine-readable instructions executable by a digital processing apparatus to perform a method for operating a computer to display historical information about hyperlinks shown on web pages, the method comprising the following operations performed by the computer:

responsive to receiving user instruction to download a web page, commencing downloading of web page;

identifying any hyperlinks present in the web page;

for each identified hyperlink, analyzing the hyperlink by performing steps comprising;

determining whether one or more uses in a predefined access group have previously selected the identified hyperlink to download underlying data represented by the hyperlink;

only if one or more users in predefined access group have previously selected the hyperlink, consulting a database to identify characteristics of the underlying data obtained from previous selections of the hyperlink by users in the access group;

referencing the identified characteristics against a presentation table to derive enhanced presentation attributes appropriate to the hyperlink;

displaying the downloaded web page, including presenting each hyperlink with its derived enhanced presentation attributes;

determining whether the computer has received predetermined user input including direction of a cursor proximate a hyperlink; and where performance of the analyzing operation for each hyperlink is conditioned upon receipt of the predetermined user input for that hyperlink.

25. An information system, comprising:

a storage including a database;

computer, coupled to the storage and configured to display historical information about hyperlinks shown on web pages by performing operations comprising:

responsive to receiving user instructions to download a web page, commencing downloading of the web page;

identifying any hyperlinks present in the web page;

for each identified hyperlink, analyzing the hyperlink by performing steps comprising:

determining whether one or more use in a predefined access group have previously selected the identified hyperlink to download underlying data represented by the hyperlink;

only if one or more users in the predefined access group have previously selected the hyperlink, consulting a database to identify characteristics of the underlying data obtained from previous selections of the hyperlink by users in the access group;

referencing the identified characteristics against a presentation table to derive enhanced presentation attributes appropriate to the hyperlink;

displaying the downloaded web page, including present each hyperlink with its derived enhanced presentation attributes; and responsive to the user selecting a hyperlink to download underlying data represented by the hyperlink, the computer downloading the underlying data represented by the hyperlink, and recording predetermined characteristics of the underlying data in the database.

\* \* \* \* \*